United States Patent [19]

Persson et al.

[11] 4,243,276
[45] Jan. 6, 1981

[54] ROLLING BODY RETAINER

[75] Inventors: Stig Persson; Sture Östling, both of Katrineholm, Sweden

[73] Assignee: Aktiebolaget SKF, Gothenburg, Sweden

[21] Appl. No.: 127,029

[22] Filed: Mar. 4, 1980

Related U.S. Application Data

[63] Continuation of Ser. No. 934,711, Aug. 21, 1978, abandoned.

[30] Foreign Application Priority Data

Sep. 22, 1977 [SE] Sweden ............................... 7710607

[51] Int. Cl.³ ............................................. F16C 33/38
[52] U.S. Cl. ..................................... 308/187; 308/201; 308/189 R
[58] Field of Search ................... 308/187, 201, 189 R, 308/217, 218, DIG. 5, DIG. 11, 187.1, 187.2

[56] References Cited

U.S. PATENT DOCUMENTS 3,073,656  1/1963  Tann ..................................... 308/201
3,212,832  10/1965  Mayer et al. .................. 308/DIG. 9

FOREIGN PATENT DOCUMENTS 2504741  8/1975  Fed. Rep. of Germany ........... 308/201
2308013  11/1976  France ..................................... 308/201

*Primary Examiner*—Lenard A. Footland
*Attorney, Agent, or Firm*—Eugene E. Renz, Jr.

[57] ABSTRACT

A unitary one-piece rolling element retainer for roller bearings consisting of inner and outer rings and rolling elements between the rings. The retainer comprises a body member made of a foamed plastic material consisting of at least one homogeneous liquid impermeable hard and rigid outer peripheral surface portion and at least one porous portion of the same material. The porous portion is filled with the lubricant and includes at least one pocket for a rolling element in the body member. The rolling element contacts the porous portion to draw lubricant during operation and also contacts the outer surface portion at the periphery of the pocket to prevent escape of lubricant from the container except through contact with the rolling element.

3 Claims, 5 Drawing Figures

ROLLING BODY RETAINER

This is a continuation, of application Ser. No. 934,711 filed Aug. 21, 1978, now abandoned.

BACKGROUND OF THE INVENTION

This invention refers to a rolling body retainer for rolling bearings. In order to give a rolling bearing a satisfactory service life it is important to arrange a good lubrication of the bearing. From service aspects it is advantageous if the bearing can be provided with as much lubricant that supply of lubricant during the calculated life of the bearing can be avoided. It is thereby known to make bearings with sealing members, which seal off the space between the bearing rings and to fill this space with grease. The rolling body retainer and the rolling bodies which during operation rotate and which are located in this space tend to remove the grease from the space and this is prevented by the sealing members. These sealing members must be very efficient in order to retain the grease and to prevent penetration of impurities into the bearing during its entire calculated life span, which for most applications will amount to several years.

It has turned out to be very difficult to bring about sufficiently efficient sealing members for this purpose. It has also been proposed to design the rolling body retainer with particular pockets for collecting the lubricant. Such a step however will increse the price of the retainer and the function is thereabove uncertain.

The purpose of the present invention is to provide a rolling body retainer, which can be easily manufactured at low cost, which is easy to handle and by means of which a bearing can be obtained, which can be provided with a sufficient quantity of lubricant for eliminating the need of subsequent lubrication, and where the lubricant is retained in the bearing in an efficient manner.

The characteristics of the invention are set out in the accompanying drawings.

The choice of retainer material furthermore means that the retainer will be comparatively elastic and the wear of the rolling bodies caused by their contact against the retainer will be insignificant. The retainer can easily be provided with integrated sealing lips, which will further add to the simplicity in obtaining a life time lubricated bearing.

BRIEF DESCRIPTION OF THE DRAWINGS

The invention will hereinafter be further described with reference to the accompanying drawing, in which.

DESCRIPTION OF THE PREFERRED EMBODIMENT

Figure 1:
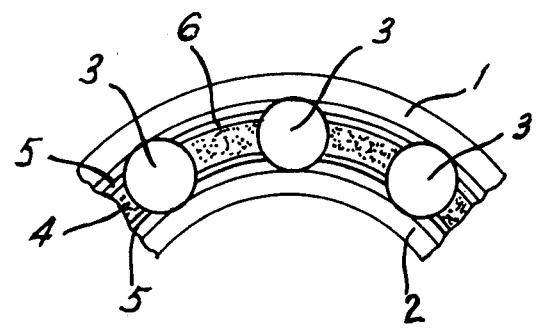
FIG. 1 shows a cross section of a portion of a bearing with a retainer according to one embodiment of the invention.

In FIG. 1 is shown a portion of a bearing having an outer race ring 1, an inner race ring 2 and a number of rolling bodies 3 arranged between said race rings. The rolling bodies are arranged in apertures in a retainer 4, which is manufactured from so called integrated foamed plastic, preferably polyurethan. The retainer has a homogeneous and comparatively rigid portion 5 and a porous portion 6 which is mainly enclosed by the surface portion. The surface portion 5 and the porous portion 6 are made in a manner well known in the integrated foam plastic technique and the apertures for the rolling bodies can be made e.g. by cutting machining in annular retainer work pieces. The apertures are delimited, at least partly, by porous material and the porous portion is preferably filled with a lubricant e.g. oil. It is thereby ascertained that the rolling bodies are always supplied with lubricant from the porous portion, which will efficiently retain the lubricant in the bearing.

Figure 2:
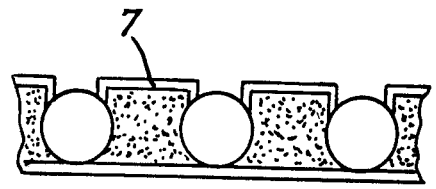
FIGS. 2 and 3 show cross sections of portions of different embodiments of the retainer spread out in one plane.
Figure 3:
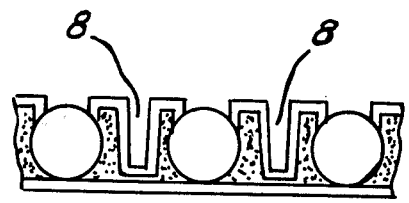

FIGS. 2 and 3 show two different embodiments of a retainer made in a single piece. With the shown design of the apertures for the rolling bodies and the comparatively large elasticity of the retainer material it is easy to assemble the retainer by snapping it axially over the rolling bodies between the outer and inner race rings. In the embodiment shown in FIG. 2 a large lubricant reservoir is obtained in the space 7 between the rolling bodies, whereas in the embodiment according to FIG. 3 the retainer is very light and elastic due to the existence of additional apertures 8 between each pair of rolling bodies.

Figure 4:
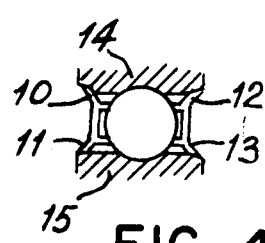
FIGS. 4 and 5 show a longitudinal section and a section spread out in one plane of another embodiment of the retainer according to the invention.
Figure 5:
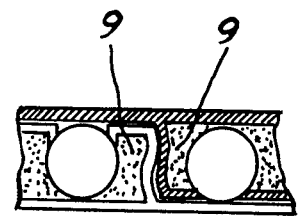

A bearing which is sealed off at both sides can be obtained if the retainer is made in the manner shown in FIGS. 4 and 5. The retainer is here made in two pieces and it is assembled by pressing the two parts axially against each other, whereby one of the parts is snapped into the other part. The retention is obtained thereby that portions of the surfaces, which contact each other are wavy, such as shown in FIG. 5 at reference number 9. Sealing lips 10, 11 and 12, 13 resp. (FIG. 4) are arranged along the edges of each retainer portion and these lips engage the outer and inner race ring 14 and 15 resp. (FIG. 4). Hereby an entirely sealed off space is obtained between the race rings whereby leakage of lubricant and penetration of impurities can be prevented.

Other embodiments of the invention than those described above are of course also possible within the scope of the claims. Ball bearings as well as roller bearings can be provided with the retainer according to the invention and retainers for several rows of rolling bodies in one bearing can be made. The shapes of the rolling body pockets and the sealing lips can be varied and can be designed in suitable manner for any specific purpose. It is also possible to use other foam plastic materials than polyurethan. Separate sealing members can be used instead of or as a complement to the integrated seals if this is considered to be appropriate.

What is claimed is:

1. A unitary one-piece rolling element retainer for roller bearings consisting of inner and outer rings and rolling elements between the rings, comprising a one-piece body member made of a foamed plastic material consisting of at least one homogeneous liquid impermeable hard and rigid outer peripheral surface portion and at least one porous portion of the same material, said porous portion being filled with a lubricant, means defining at least one pocket for a rolling element in said body member, the rolling element contacting said porous portion to draw lubricant therefrom during operation, said rolling element also contacting said outer surface portion at the periphery of the pocket to prevent escape of lubricant from the retainer except through contact with the rolling element.

2. A rolling element retainer as claimed in claim 1 including a plurality of circumferentially spaced pockets in the annular body member and a series of slotted openings between the pockets permitting assembly of the retainer by snapping it axially over the rolling elements disposed between the inner and outer rings of the bearing assembly.

3. A rolling element retainer as claimed in claim 1 including a pair of complementary body members of a predetermined configuration to snap together axially over the rolling elements.

* * * * *